Jan. 22, 1963
J. A. DUVOISIN
3,074,177
CENTERING DEVICE
Filed April 15, 1959
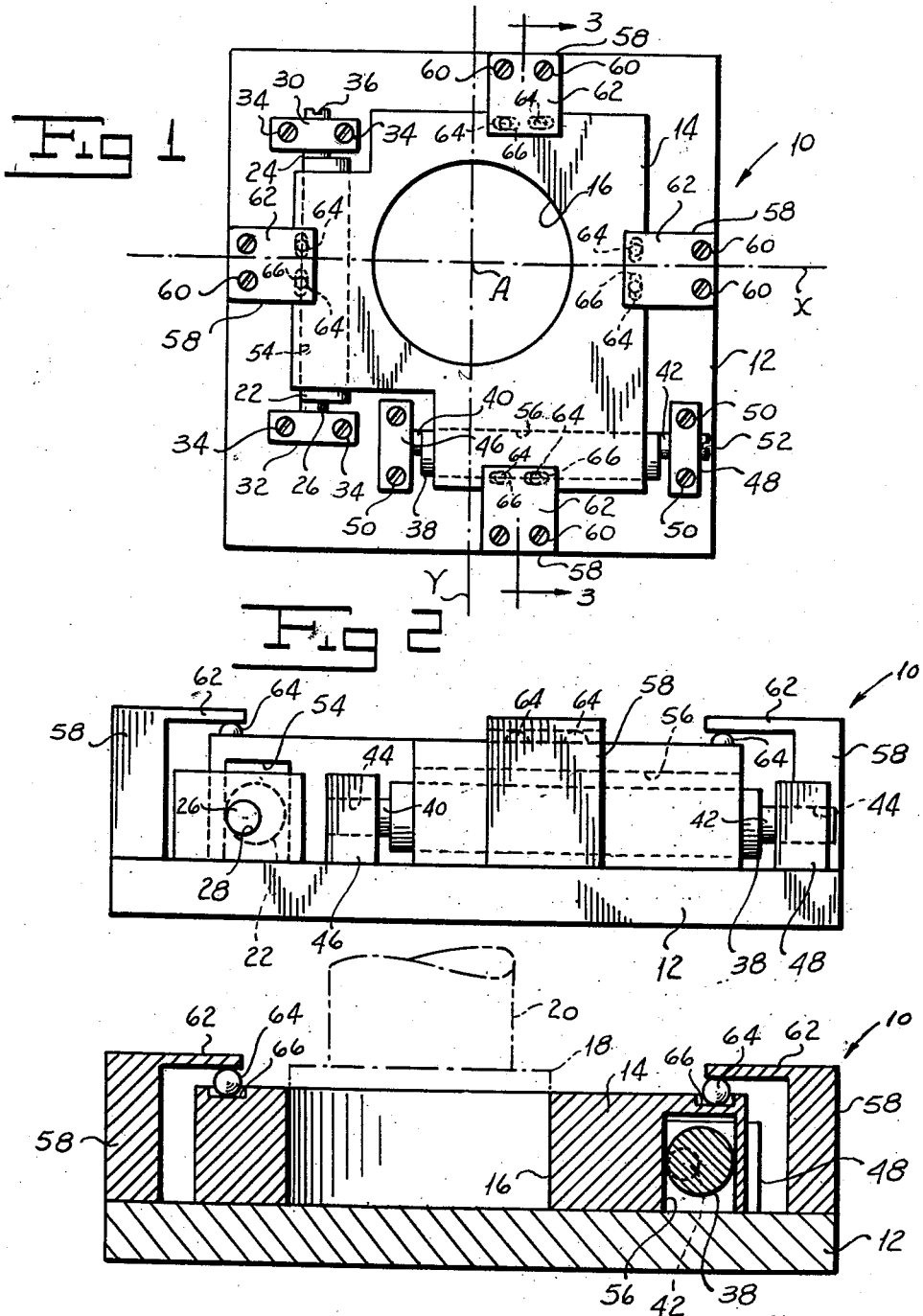
INVENTOR
JEAN A. DUVOISIN
BY
ATTORNEY

United States Patent Office 3,074,177
Patented Jan. 22, 1963

3,074,177
CENTERING DEVICE
Jean A. Duvoisin, Briar Cliff Manor, N.Y., assignor to United Aircraft Corporation, East Hartford, Conn., a corporation of Delaware
Filed Apr. 15, 1959, Ser. No. 806,644
4 Claims. (Cl. 33—180)

My invention relates to a centering device and more particularly to an improved centering device for rapidly and accurately aligning a pair of relatively movable members.

There are many instances in which it is necessary that a member be accurately centered with respect to another member if a device is to operate in the desired manner. This is particularly true in the art of electromechanical devices in which a rotor must be accurately centered with respect to a stator if the electrical output signal from the device is to be truly representative of relative movement between the stator and rotor. There are many other situations in which accurate centering is required such, for example, as in the machine tool art.

Various devices are known in the prior art for adjusting the position of one element with respect to another to center the first element. Many of these devices employ separate means for locking the elements in the relative position to which they have been adjusted. These locking devices tend to introduce errors into the adjusted relative position. Some centering devices of the prior art introduce rotary motion into the element being centered. This is highly undesirable in many instances such, for example, as in an instrument which is designed to indicate relative rotary displacement of a rotor from a predetermined zero position with respect to a stator. Other centering devices have undesirable dead spots and permit axial play between the adjusted elements. Centering devices of the prior art generally are complicated and require an inordinate amount of time to accomplish the desired result.

I have invented a centering device which overcomes the defects of centering devices of the prior art pointed out hereinabove. My centering device has a small number of moving parts and may readily be manufactured with standard facilities. My device is self-locking and thus does not introduce any errors such as would be introduced by separate locking means of the type known in the prior art. My centering device greatly reduces the time required to align accurately a pair of relatively movable members. My centering device substantially eliminates dead spots and axial play.

One object of my invention is to provide an improved centering device for rapidly and accurately aligning a pair of relatively movable members.

Another object of my invention is to provide an improved centering device which is self-locking.

A further object of my invention is to provide a centering device having a small number of moving parts which may readily be manufactured with standard facilities.

A still further object of my invention is to provide an improved centering device which substantially eliminates dead spots and axial play.

Other and further objects of my invention will appear from the following description.

In general my invention contemplates the provision of a centering device including a slide retained on a base plate for movement with respect thereto. I mount respective eccentrics on the base plate for rotation about intersecting axes. I form the slide with slots for receiving the eccentrics. Rotation of one eccentric positions the slide along one of the axes while the other eccentric guides the slide in its movement. The composite motion of the slide under the action of the eccentrics may be employed accurately to center the slide on the base plate.

In the accompanying drawings which form part of the instant specification and which are to be read in conjunction therewith and in which like reference numerals are used to indicate like parts in the various views:

FIGURE 1 is a plan view of my improved centering device.

FIGURE 2 is a front elevation of my centering device drawn on an enlarged scale.

FIGURE 3 is a sectional view of my centering device taken along the line 3—3 of FIGURE 1 and drawn on an enlarged scale.

Referring more particularly to the drawings, my centering device indicated generally by the reference character 10 includes a base plate 12 which may, for example, carry or be stationarily mounted with respect to the stator (not shown) of an electromechanical device. I form a slide 14 with an opening 16 which, for example, may receive a bearing 18 which supports the shaft 20 of the rotor (not shown) of an electromechanical device, for example, with which my centering device may be used.

I provide a first eccentric 22 with journals 24 and 26 received in bearing openings 28 in respective brackets 30 and 32 secured to the base plate 12 by any suitable means such, for example, as by screws 34. I form the end of journal 24 with a slot 36 for receiving a tool by means of which the eccentric 22 may be turned.

I provide a second eccentric 38 with respective journals 40 and 42 received in bearing openings 44 in respective brackets 46 and 48 secured to the base plate 12 by any suitable means such as screws 50. I form the end of journal 42 with a slot 52 for receiving a tool by means of which the eccentric 38 may be turned.

I provide the slide 14 with respective recesses or slots 54 and 56 for receiving the eccentrics 22 and 38. A plurality of retainers 58 secured to the base plate 12 by means of screws 60 or the like have extensions 62 which engage balls 64 carried in recesses 66 in slide 14 to retain the slide 14 on the plate 12, while permitting relative sliding movement between the slide and the plate.

As has been explained hereinabove, I mount the respective eccentrics 22 and 38 for movement about axes which intersect. Preferably, I mount the eccentrics for movement about mutually perpendicular axes in order to achieve the greatest movement of the slide 14 in the direction of one of the axes for a given amount of rotation of an eccentric.

In operation of my centering device the stator or the like of the apparatus (not shown), with which my device is used, may be carried by the base plate 12 or, if not carried thereby, is fixed with respect thereto. The bearing 18 of the rotor (not shown) is carried in the opening 16 in slide 14. In order to adjust the relative position of the rotor and stator to center the rotor with respect to the stator, eccentric 22 is rotated about its axis to position the slide 14 along the axis designated the "X" axis in FIGURE 1. The eccentric 38 is rotated about its axis to position the slide 14 along an axis designated the "Y" axis in FIGURE 1. Under the compound action of the two eccentrics, the center "A" of the opening 16 may accurately be positioned with reference to the base plate 12. Once the adjustments have been made, the slide 14 is held in its adjusted position without the intervention of any auxiliary locking mechanism. If desired, of course, the eccentrics 22 and 38 could be mounted for movement about any other pair of intersecting axes. In this case, however, the adjustments provided would not be along the "X" and "Y" axes shown in the figure.

It will be seen that I have accomplished the objects of my invention. I have provided a centering device which overcomes the defects of centering devices of the prior art. My centering device rapidly and accurately aligns a pair of relatively movable members without substantial axial play or dead spots. My device is self-locking. It has a small number of moving parts which may readily be manufactured with standard production facilities. My device is especially adapted to align relatively movable components of electromechanical devices.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A centering device including in combination a support, a slide, means mounting said slide for movement on said support, first interengageable means comprising a pair of elements respectively carried by said slide and by said support and second interengageable means comprising a pair of elements respectively carried by said slide and by said support, one element of each of said interengageable means comprising an eccentric, and means mounting said eccentrics of said first and second interengageable means for movement about intersecting axes, each of said first and second interengageable means comprising means for constraining said slide to move in a substantially straight line in response to operation of the other interengageable means.

2. A centering device including in combination a support, a first cylindrical eccentric, means mounting said first eccentric on said support for rotary movement about a first axis, a second cylindrical eccentric, means mounting said second eccentric on said support for rotary movement about a second axis intersecting said first axis, and a slide formed with respective elongated slots for receiving said eccentrics, said eccentrics being adapted to be actuated to center said slide on said support.

3. A centering device including in combination a support, a first cylindrical eccentric, means mounting said first eccentric on said support for rotary movement about a first axis, a second eccentric, means mounting said second eccentric on said support for rotary movement about a second axis intersecting said first cylindrical axis, a slide formed with respective elongated slots for receiving said eccentrics, and means for retaining said slide on said support.

4. A centering device including in combination a support, a first cylindrical eccentric, means mounting said first eccentric on said support for rotary movement about a first axis, a second cylindrical eccentric, means mounting said second eccentric on said support for rotary movement about a second axis intersecting said first axis, and a slide formed with respective elongated slots for receiving said eccentrics, said eccentrics being adapted to be actuated to center said slide on said support, said axes being mutually perpendicular.

References Cited in the file of this patent

UNITED STATES PATENTS

| | | |
|---|---|---|
| 571,584 | Thomas | Nov. 17, 1896 |
| 1,449,506 | Ford | Mar. 27, 1923 |
| 1,914,126 | Huebner | June 13, 1933 |
| 2,018,550 | Freeman | Oct. 22, 1935 |
| 2,424,011 | De Gramont | July 15, 1947 |
| 2,650,056 | Masoner | Aug. 25, 1953 |
| 2,772,485 | Gelb | Dec. 4, 1956 |

FOREIGN PATENTS

| | | |
|---|---|---|
| 644,784 | Great Britain | Oct. 18, 1950 |